Feb. 27, 1973  J. R. MUNGER ET AL  3,718,095
BURN OUT PERFORATION FOR ROCKET PROPELLANTS
Filed Sept. 26, 1968

John R. Munger
Sherman E. Tate,
INVENTORS.

United States Patent Office 3,718,095
Patented Feb. 27, 1973

3,718,095
BURNOUT PERFORATION FOR ROCKET PROPELLANTS
John R. Munger, Huntsville, and Sherman E. Tate, Hartselle, Ala., assignors to the United States of America as represented by the Secretary of the Army
Filed Sept. 26, 1968, Ser. No. 763,030
Int. Cl. F02k 9/04
U.S. Cl. 102—102                             2 Claims

ABSTRACT OF THE DISCLOSURE

A means has been provided to utilize the previously open unused core space in the propellant grain of a rocket motor thus saving wasted space while providing additional thrust to the rocket. The core space is filled with propellant and filamentary means is located in the normal core space or a more rapid burning propellant is cast in the normal core space. The filamentary means can consist of thin metal tubes, strands of very high burning rate propellant or small holes drilled or cast through the propellant in the normal core space.

BACKGROUND OF THE INVENTION

This invention is in the field of rocket propellants. The problem is to increase the capacity of propellant grain having a given size and shape. Most propellant grains have perforations for cores determined by production considerations such as motor loading and the removal of the mandrel used to form the perforation. This core or perforation is considered by the inventors as usable space for additional propellant that would increase the payload capacity of a rocket motor.

SUMMARY OF THE INVENTION

The present invention provides a solution by locating filamentary means, such as thin metal or very high burning rate propellant tubes, in whatever cross-sectional shape of the propellant grain desired. An alternative means to provide a filamentary means is to load the motor with propellant grain and drill or cast small holes through the propellant grain. Another alternative is to fill the core space with a propellant that will burn more rapidly than the propellant grain. The purpose of the filamentary means or the more rapidly burning propellant is to establish the required propellant burning surface.

This invention may be better understood from the following detailed description taken in conjunction with the accompanying drawings.

DESCRIPTION OF THE PREFERRED EMBODIMENTS OF THE INVENTION

Figure 2:
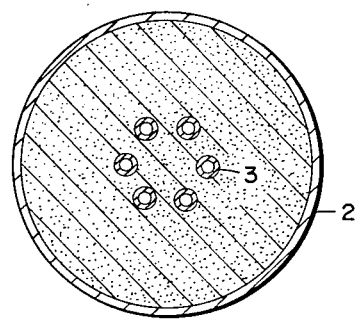
FIG. 2 is a section view taken on line 2—2 of FIG. 1.
Figure 1:
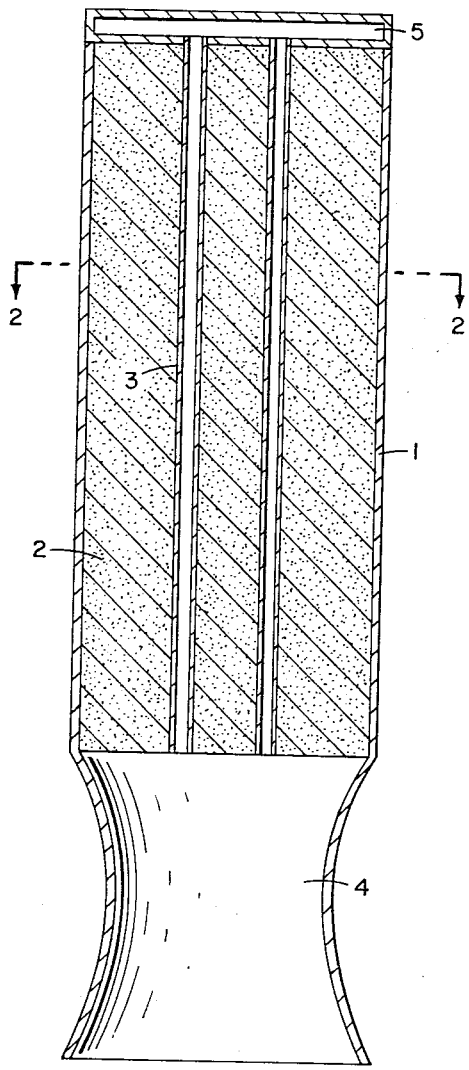
FIG. 1 is a section view of the rocket motor showing thin metal tubes encased in the propellant grain.

In the embodiment shown in FIGS. 1 and 2, rocket motor 1 is shown with a longitudinal core space completely filled with propellant grain 2 and encasing longitudinal filament means such as thin metal tubes 3. These tubes are located in the normal core space of the propellant grain and are of the same length as the propellant grain. The tubes have an inside diameter of approximately .01 inch and provide the perforation in the propellant grain for conducting the hot gases generated from nozzle 4 to plenum chamber 5. An alternative means such as very high burning rate propellant tubes can be used in place of metallic tubes to provide the required propellant burning surface. The tubes may be provided with whatever cross-sectional shape that is desired. When the motor is loaded with propellant the filamentary means are encased therein.

After the propellant grain is ignited, a portion of the gas generated passes through the holes into the plenum chamber. Thus, the gas heats the propellant in the immediate area of the tubes and this heat in turn increases the local burning rate of the propellant grain. The propellant tubes will burn faster than the propellant grain, thus, while burning, they will also increase the local burning rate of the propellant grain. After burnout of the propellant tubes, small holes will remain in the main propellant to allow the gases to also pass through the holes.

Figure 3:
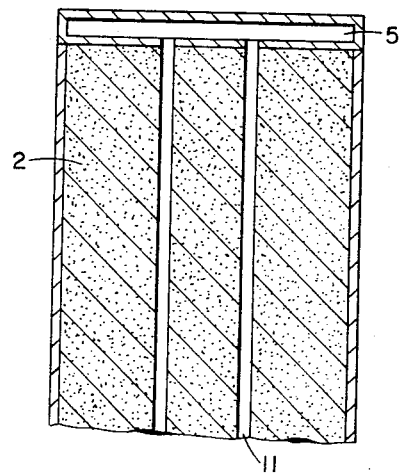
FIG. 3 is a section view of the rocket motor showing small holes drilled or cast through the propellant grain.

In the embodiment shown in FIG. 3, the entire motor is loaded with propellant grain and small holes 11, another form of filamentary means, have been drilled or cast through the propellant. These holes perform the same function as the tubes in the first embodiment and are also located in whatever cross-sectioned shape of the propellant grain that is desired.

Figure 4:
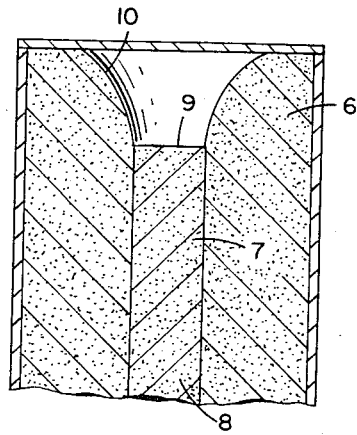
FIG. 4 is a section view showing the core space filled with a rapid burning propellant.

Referring now to the embodiment shown in FIG. 4, an outer propellant grain 6 is shown with core space 7. A more rapidly burning propellant 8 is cast in the core space of the outer propellant. FIG. 4 shows some of propelalnt grain 8 having been burned out at 9 and the outer propellant grain burning at 10. While only one design of core perforation has been shown for illustrative purposes, it is understood that any desired design of core perforation in the outer propellant grain can be formed and subsequently filled with the more rapid burning propellant.

It can be seen from the disclosure of these embodiments that the utilization of the heretofore unused core area gives additional impulse to the rocket during the boost phase of propulsion and also provides additional flexibility in designing the burning surface of the propellant grain.

We claim:
1. A rocket having an increased motor payload capacity comprising: a motor provided with a nozzle at one end thereof and an elongated solid propellant grain having perforations, said motor including means for raising the heat of exhaust gases generated by the combustion of said propellant grain, said means comprising an enclosed plenum chamber at the other end of said motor and metallic tubes extending the entire length of said propellant grain through said perforations and connecting said nozzle with said plenum chamber, whereby upon the ignition of said propellant grain and said tubes hot gases pass into said plenum chamber and raise the combustion rate of said propellant grain.
2. A rocket as in claim 1 with said tubes composed of high burning rate propellant.

References Cited
UNITED STATES PATENTS

| 3,140,663 | 7/1964  | Rumbel et al.   | 102—102   |
| 3,105,350 | 10/1963 | Eichenberger    | 102—101 X |
| 3,204,560 | 9/1965  | Gustavson       | 102—102 X |
| 3,292,545 | 12/1966 | Matsubara       | 102—101   |
| 3,418,811 | 12/1968 | Caveny et al.   | 102—102 X |
| 3,429,265 | 2/1969  | Longwell et al. | 102—102 X |

ROBERT F. STAHL, Primary Examiner

U.S. Cl. X.R.
60—255